United States Patent [19]

Jackson et al.

[11] 3,954,556
[45] May 4, 1976

[54] INORGANIC COMPOSITION FOR HIGH TEMPERATURE USE AND METHOD OF FORMING A MILLBOARD THEREFROM

[75] Inventors: Fred L. Jackson, Denver; John Wilmer Axelson, Littleton, both of Colo.

[73] Assignee: Johns-Manville Corporation, Denver, Colo.

[22] Filed: June 10, 1974

[21] Appl. No.: 477,574

[52] U.S. Cl. .................... 162/145; 29/132; 65/374 R; 65/374 RM; 106/99; 162/154; 162/155; 162/181 C; 162/181 D; 252/62
[51] Int. Cl.² .................. D21F 11/08; D21H 5/18
[58] Field of Search .......... 162/153, 145, 154, 155, 162/181 D, 181 C; 65/374 R, 374 RM; 29/132; 106/58, 69, 99; 252/62

[56] References Cited
UNITED STATES PATENTS

| | | | |
|---|---|---|---|
| 2,005,356 | 6/1935 | Toohey et al. | 252/62 |
| 2,162,386 | 6/1939 | Neuhof | 162/181 D X |
| 2,182,353 | 12/1939 | Rembert et al. | 162/154 X |
| 2,531,016 | 11/1950 | Waechter | 162/154 |
| 2,695,549 | 11/1954 | Quinn | 162/181 C X |
| 2,887,428 | 5/1959 | Baymiller et al. | 162/145 |
| 3,095,346 | 6/1963 | Sfiscko et al. | 162/154 |
| 3,120,465 | 2/1964 | Schneider | 162/154 X |
| 3,334,010 | 8/1967 | Moore | 106/99 X |
| 3,344,015 | 9/1967 | Neal et al. | 162/154 X |
| 3,354,031 | 11/1967 | Kozacik | 162/154 X |
| 3,456,931 | 7/1969 | Ermenc et al. | 29/132 X |
| 3,510,394 | 5/1970 | Cadotte | 162/155 X |
| 3,573,158 | 3/1971 | Pall et al. | 162/181 C X |
| 3,692,509 | 9/1972 | Breiner | 65/374 R |

*Primary Examiner*—S. Leon Bashore
*Assistant Examiner*—Arthur L. Corbin
*Attorney, Agent, or Firm*—Robert M. Krone; Joseph J. Kelly; James W. McClain

[57] ABSTRACT

An inorganic composition useful as material for Lehr rolls at temperatures above 500°C consists essentially of 15–45% chrysotile asbestos, 40–75% talc component and 2–35% inorganic binder. The composition is also used in manufacturing millboard by forming a water slurry of said composition and transferring said slurry to a rotating screen cylinder, then to a moving belt and then to a rotating drum upon which layers of said slurry accumulate upon each other and are thereafter slit, dried and formed into a flat sheet.

26 Claims, 5 Drawing Figures

U.S. Patent   May 4, 1976   3,954,556
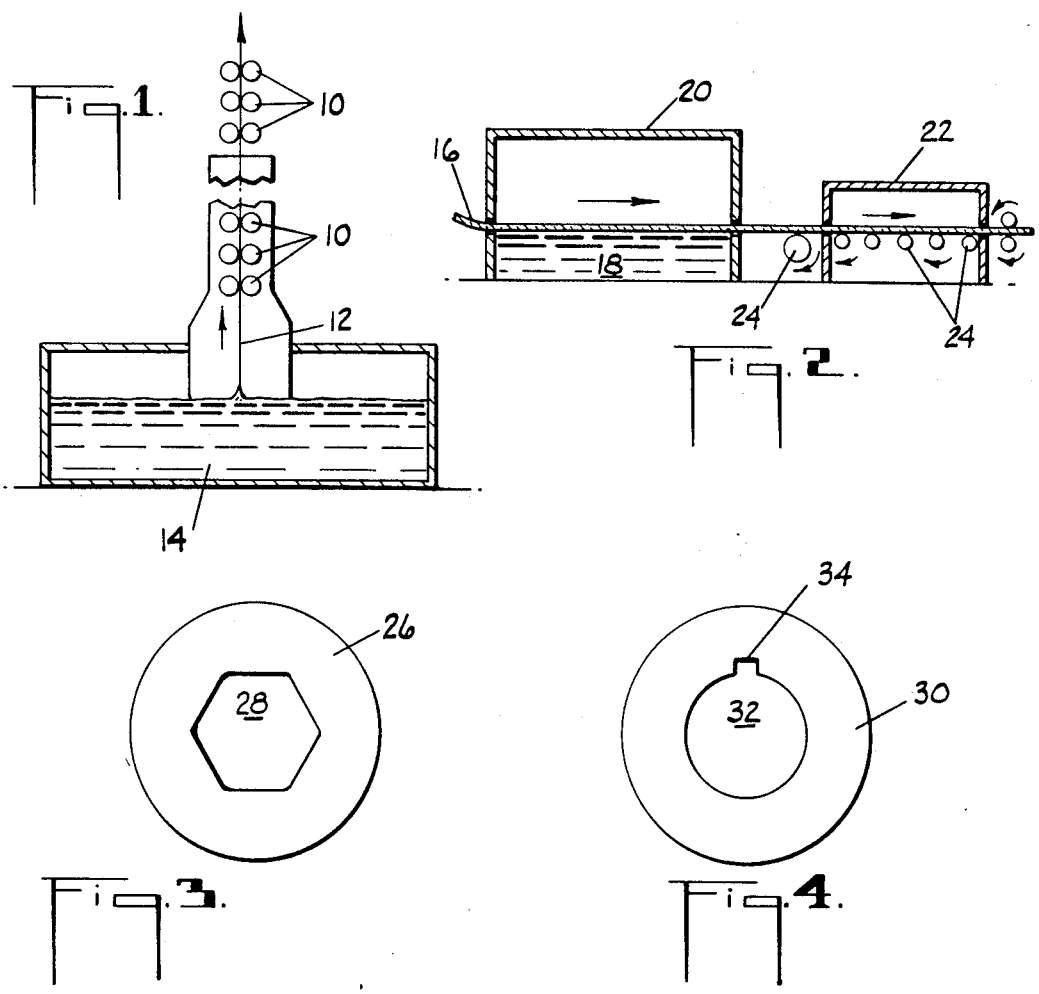
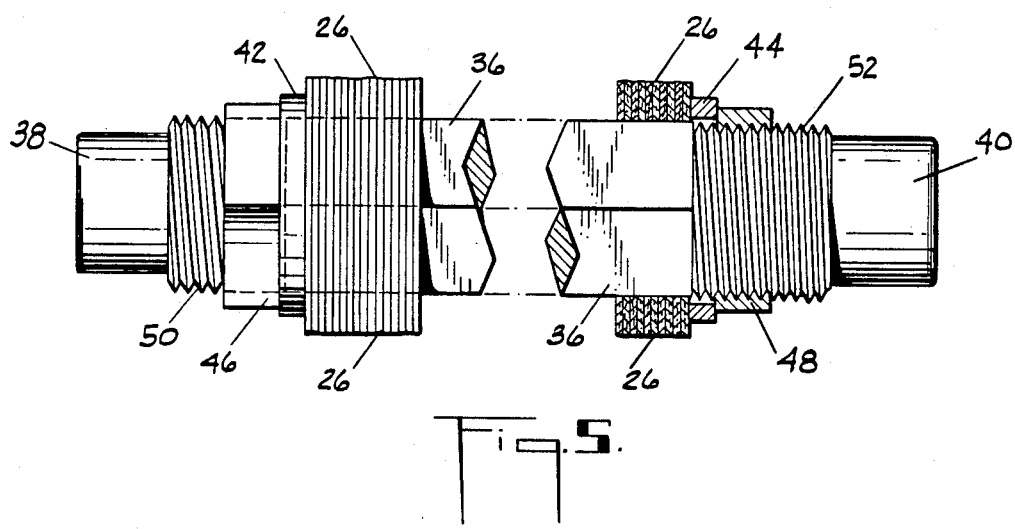

INORGANIC COMPOSITION FOR HIGH TEMPERATURE USE AND METHOD OF FORMING A MILLBOARD THEREFROM

BACKGROUND OF THE INVENTION

1. Field of the Invention

This invention relates to asbestos/talc compositions intended for high temperature service in glass and steel, aluminum, and other metal manufacturing processes. More particularly, it relates to millboard compositions from which can be produced Lehr rolls which come into contact with the high temperature surfaces of glass and metal sheets.

In glass making processes it is often necessary to continuously move very hot sheets of glass. To accomplish such movement is the function of high-temperature-resistant roller assemblies known as "Lehr rolls." For instance, in the "Fourcault" process, illustrated in FIG. 1, Lehr rolls 10 arranged in a vertical array draw a hot semimolten glass sheet 12 out of a pool 14 of molten glass. As the sheet progresses upward through the vertical Lehr roll array, it is cooled and emerges at the top as a solidified glass sheet ready for cutting. In the more recently developed "float glass" process illustrated in FIG. 2, molten glass 16 is flowed across the surface of a pool 18 of liquid metal inside a high temperature float bath 20. The molten glass 16 forms a sheet which is drawn from the float bath and through an annealing oven 22 by various arrays of Lehr rolls 24. In both of these processes, the Lehr rolls must have the ability to withstand surface contact temperatures of 750°C or greater. They must also maintain a surface texture which is sufficiently smooth such that contact with the Lehr rolls does not mar the surface of the glass sheets. This is particularly true in the float glass process, where the glass sheet emerging from the float bath has an exceptionally flat and smooth surface.

Lehr rolls also find extensive use in the processes for manufacturing plates of steel, aluminum and other metals where high temperature formation of the plates is involved. In some of these processes, the metal plates are annealed in annealing ovens in which temperatures as high as 1200°C are maintained. Lehr rolls are mounted inside these ovens to support and convey the plates through the ovens. In addition to the obvious requirement of high temperature stability under such conditions, surface smoothness of the Lehr rolls is also necessary, for with many of the metal sheets being produced (such as those of stainless steel) good surface finish is a requirement.

2. Description of Prior Art

Rollers containing portions composed of asbestos fibers and binder are disclosed in U.S. Pat. No. 1,854,509. The rollers there described are intended for low temperature service and the asbestos portions are intended solely to prevent heat transfer from metal end plates into the midsection of the roller, which is composed of non-heat-resistant materials. Roll discs composed of long asbestos fibers bound with organic thermosetting resins are described in U.S. Pat. No. 2,987,802. Roll discs composed of a mixture of different asbestos fibers bound with an inorganic binder are described in U.S. Pat. Nos. 3,317,303; 3,334,010; and 3,456,931; use of a mixture of fibers in conjunction with the inorganic binder is said to increase the service life of the rolls at high temperature. A rubber/asphalt sheet composition containing asbestos and a material designated "fibrous talc" is described in U.S. Pat. No. 2,887,428.

BRIEF SUMMARY OF THE INVENTION

The composition of this invention is an inorganic composition suitable for use at temperatures in excess of 500°F. The composition consists essentially of a chrysotile asbestos fiber component, a talc component, and an inorganic binder component. Use of these three components in the composition provides a product which has exceptionally long service life, the ability to withstand the extremes of temperature to which Lehr rolls are subjected, excellent surface characteristics and very favorable economics.

BRIEF DESCRIPTION OF THE DRAWINGS

FIG. 1 illustrates schematically a Fourcault glass making process utilizing Lehr rolls of the composition of this invention.

FIG. 2 illustrates schematically a float glass process also using Lehr rolls of the composition of this invention.

FIGS. 3 and 4 each illustrate a side view of a single Lehr roll disc made from a composition of this invention.

FIG. 5 illustrates (partially in section) a number of the discs of FIG. 3 (seen in side view) assembled on a mandrel to form a Lehr roll.

DETAILED DESCRIPTION AND PREFERRED EMBODIMENTS

This invention is of a heat-resistant, thermally stable composition suitable for use in high temperature Lehr roll service. Lehr rolls made from the composition of this invention have good dimensional stability at high temperature. Surfaces can be machined to a smooth finish which will not mar the contacting surface of sheets of glass or metal. When, after extended service, small surface irregularities form, these can be readily removed and the roll returned to its initial surface condition, thus significantly extending the service life of the roll. Further, the compositions of this invention can often be produced at substantially lower raw materials cost than conventional Lehr roll compositions.

The asbestos fiber component consists entirely of chrysotile asbestos and is entirely free of the long amphibole asbestos varieties: amosite and crocidolite. (For the purposes of this invention the other amphibole asbestos materials: anthophyllite, tremolite, and actinolite, are not included in this definition of long amphibole asbestos fibers. As noted in aforesaid U.S. Pat. No. 3,334,010, these varieties have such weak and brittle fibers and their compositions are so variable that they are unsuitable for use as the asbestos fiber component. In very finely divided form, they may appear to some extent as impurities in the talc component, as discussed below.)

The crux of this invention lies in the combination of the chrysotile asbestos and the talc component. The prior art, exemplified by those patents described above, has in the past stressed that suitable high temperature service can only be obtained by combining chrysotile asbestos with the amphibole varieties of crocidolite and/or amosite. The use of chrysotile fibers alone as the asbestos component is taught to be substantially detrimental. The invention herein, however, resides in the unexpected and surprising discovery that a combination of chrysotile asbestos and talc is not only highly satisfactory for use in such high temperature environments, but in fact has better properties under equivalent conditions than do the conventional chrysotile/amphibole materials.

The chrysotile asbestos is a hydrated basic magnesium silicate which has the approximate formula $3MgO.2SiO_2.2H_2O$. About 90% or more of the total world production of asbestos is chrysotile and virtually all of the asbestos produced in the United States and Canada is of the chrysotile variety. Chrysotile asbestos usually contains about 10–14% of water of crystallization (chemically combined water). The composition and properties vary somewhat in different deposits and small amounts of other minerals are usually present as impurities, including lime, iron oxides, manganese oxide, and alumina, some of which may occur in the fibrous crystals.

The chrysotile asbestos fiber component of this invention will be present as from about 15–45 weight % of the composition, preferably 20–40 weight %.

Chrysotile fiber is normally graded according to size to standards promulgated by the Quebec Asbestos Mining Association. The size grading standards are based on the proportions of a specified weight of asbestos fiber sample which pass through designated screens. Lower numbers and letters designate longer fibers, with the numbers designating groups of sizes and the appended letters designating finer size differentiations within specific number groups. Thus, grade 7 fibers average shorter than grade 5 fibers, and within a given numerical grade, grade M fibers will be shorter than grade D fibers, and so forth. For the purposes of this invention those fibers in grades 3 through 7 are satisfactory with preference to grades 5 and 6. The chrysotile fiber component may consist entirely of a single grade of fibers, or mixtures of grades may be used. Incorporation of longer grades with shorter grades will generally reduce the overall density of the millboard as compared to the density obtained with the shorter grade alone. Particularly preferred is a mixture of approximately equal amounts of grade 5 and grade 6 fibers.

The talc component herein consists of all or a major portion (i.e., more than 50%) of talc and in some cases a minor portion (i.e., less than 50%) of associated materials such as tremolite or anthophyllite, both the talc and any associated materials being finely divided. By "finely divided" is meant that virtually all particles will pass through a 400 mesh screen, and preferably all particles will have a particle size finer than 30 microns. Preferably the particle distribution will be such that the average particle size is in the range of 2–10 microns and a maximum particle size is on the order of approximately 20 microns (maximum measurements being based on less than 1% of the particles being in excess of the "maximum" size). The talc, which is a platey magnesium silicate having the approximate formula $Mg_6(Si_8O_{20})(OH)_4$, a chemically bound water content of approximately 2–5%, and small amounts of impurities (totalling only a few percent) of materials such as iron oxide, manganese oxide, calcium oxide, sodium oxide, titanium dioxide, and potassium oxide, is derived from minerals such as soapstone or steatite. The platey talc will be present as more than 50% and preferably not less than 60%, more preferably not less than 70% (all by weight), of the "talc component." The remainder of the talc component (i.e., less than 50%, 40%, or 30%, respectively) in commercial talc generally consists of associated minerals, usually tremolite and anthophyllite. The fact that these associated minerals are acicular sometimes leads to the designation of the talc material as so-called fibrous talc; the latter is a misnomer, however, for the material so named is in fact not a fibrous form of talc (which does not exist) but rather a mixture of acicular materials with platey talc. In commercial practice the fibrous talc may be considered to be that in which the talc and associated minerals in the deposit from which the ore is taken have not been separated upon refinement, while purer grades of talc are composed of those which have been subjected to such separation as will remove the acicular materials. For the purposes of this invention, however, all grades of talc from virtually pure talc to any containing less than 50% by weight of impurities such as tremolite and/or anthophyllite are suitable for use in the invention.

The talc component will be present as from 40–75 weight % of the composition herein, preferably 45–65 weight %. Since, as will be noted below, it is desired to maintain the inorganic binder at a relatively constant level, variations in compositions will normally be obtained by raising the concentration of chrysolite fiber and simultaneously lowering the concentration of the talc component, or vice versa.

The inorganic binder component generally includes both a self-setting hydraulic cement, such as a Portland cement, and a plastic montmorillonite clay such as bentonite. The hydraulic cement will be present in amounts of 1–20% by weight of the composition and preferably in amounts of from 5–15% by weight. The montmorillonite clay will be present in amounts of from 1–15% by weight and preferably in amounts of from 3–12% by weight. Total inorganic binder content will therefore be in the range of 2–35% by weight of the composition, preferably 8–27% by weight. In most cases the hydraulic cement content will exceed in amount the clay content of the binder, usually by approximately a factor of two.

The hydraulic cement used as a component of the binder may be any of the standard Portland cements. The montmorillonite clay usually found most suitable in the binder is a high swelling natural bentonite clay. However, other bentonite clays may be used, including those which have been modified by heat treatments, treatment with acid, salt or alkalies, or by ion exchange processes. Part of the bentonite clay may also be replaced by other finely divided plastic clay.

Millboard may be formed from the compositions of this invention in the same general manner as commonly used in asbestos millboard production and in asbestos paper making. In these processes, one starts with a water slurry containing the chrysotile fibers, talc component, and binder. This is picked up on a rotating screened cylinder, then transferred to a moving belt and to a rotating drum whereon a thickness is accumulated by building up layer upon layer to the desired thickness, 1mm to 15mm, usually about 6mm. Thereafter the accumulated layers are slit longitudinally of the drum, placed in flat sheet form and dried. From the dried sheets, discs of the types illustrated in FIGS. 3 and 4 are cut.

If desired, a small amount of a wetting agent may also be present. The wetting agent may be any of a wide variety of materials selected from that class of materials referred to broadly as wetting, emulsifying or flocculating agents or the like. These include materials such as nonionic acrylamine polymers, sulfonated dicarboxylic acids, and other related materials. These are widely described in the art and are quite familiar to those experienced in paper making processes; they need not be exemplified further here. The wetting agent is added to the slurry in amounts equal to about 0.01 to 1.0 weight % (based on the solid fiber-binder composition), preferably 0.1 to 0.5 weight %. Mixtures of wetting agents may be used where desired and where the individual materials are compatible with each other and with the components of the slurry. The organic wetting agent is present only for aid in manufacture. At the temperatures of use of the finished product all organic material will be removed.

Typical Lehr roll discs and a roller assembly using the composition of this invention are illustrated in FIGS. 3–5. FIGS. 3 and 4 illustrate typical discs cut from mill board formed in the manner described above. Each of these discs will generally be from about 10–50 cm in diameter. Both discs contain center openings shaped to fit a mandrel. In FIG. 3 the disc 26 is illustrated as having a center opening 28 which is hexagonal in form. In FIG. 4 the disc 30 contains a circular center opening 32 which has contained therein a keyway 34, adapted to fit a corresponding key and keyway in a mandrel (not shown).

FIG. 5 illustrates a typical Lehr roll. Extending the full length of the roll at its center is mandrel 36. For most of its length the mandrel is hexagonal in cross-section, thus adapted to accept discs 26 of the shape shown in FIG. 3. The end portions 38 and 40 are cylindrical, however, and are adapted to rotate in bearings. If desired, they may also be adapted to accept some form of motive power, as for instance, a gear drive or pulley arrangement. Methods of powering such rollers are conventional and are not here shown. A series of discs 26 are mounted in abutting position along substantially the full length of the hexagonal portion of mandrel 36. The discs 26 are normally compacted axially along the mandrel 36 by, for instance, a hydraulic ram. The series of discs is maintained in position by washers 42 and 44 which abut the series of discs at each outer end. To maintain the entire assembly in place under the compacting pressure, nuts 46 and 48 are screwed onto threaded portions 50 and 52 respectively of the mandrel 36. By placing the discs under compression in this manner, relative slippage of adjacent sections of the roll surface is avoided and allowance is made for possible slight shrinkage of the discs upon heating.

The following examples will illustrate the compositions of this invention.

Two separate sets of millboard sheets were made to determine the properties of the product. One set, whose properties are listed in Table 3 below, were made as laboratory hand sheets, using standard laboratory techniques. A second set, whose properties are listed in Table 2 below, were made on a wet process paper making machine. The chrysotile fibers were first beaten for 10 minutes at a load of 220 newtons and then transferred to the wet machine mixer along with the talc, cement, and clay. Sufficient water was provided to prepare a slurry containing 1–2% solids. The wet machine was set to run at 8.7 meters per minute with maximum vacuum. The flow rate was adjusted to achieve minimum overflow from the vat. In addition, about 0.125% (based on dry solids) of a commercial synthetic nonionic watersoluble polymer of acrylamide (available from the Dow Chemical Company under the trademark "Separan NP10") was added to the water slurry.

In addition, three control samples containing large amounts of amosite asbestos and representative of prior art compositions were tested. One was produced as a laboratory hand sheet, one on the aforementioned wet machine and a third in a commercial millboard plant. The properties of all three were sufficiently similar that they can all be accurately represented by a composite average of the three. These data are shown in Table 1 below.

In the examples below, present moisture was calculated according to the formula $$\frac{W_w - W_d}{W_w} \times 100\%$$

wherein:
$W_w$ = wet weight; sample weight exposed to the atmosphere
$W_d$ = dry weight; sample dried at 300°F for 24 hours; cooled in a desicator and weighed Percent ignition loss was determined by the following formula $$\frac{W_d - W_i}{W_d} \times 100\%$$

wherein:
$W_i$ = ignition weight; sample held at 1200°F for 24 hours; cooled in a desicator and weighed Compression and recovery were determined according to ASTM Method F-36. "Normal" compression and recovery are the properties of the dried millboard. "650°C" compression and recovery are properties of the millboard after it has been subjected to 650°C for 16 hours while under a compression of 5860 kg/m². For comparison purposes, the higher the value of modulus of rupture, the stronger the millboard; the lower the compression value, the more resistant the millboard is to compression; and the higher the recovery value, the more resilient is the millboard.

TABLE 1

| Formulation, wt. % | |
|---|---|
| Asbestos fiber | |
|   Chrysotile | 25% |
|   Amphibole (Amosite) | 25% |
| Talc | 35% |
| Portland Cement | 10% |
| Betonite Clay | 5% |
| Properties | |
|   density[a] | 0.99 gm/cm³ |
|   ignition loss[a] | 6.7% |
|   compression[b] | |
|     normal | 27.3% |
|     650°C | 26.9% |
|   recovery[b] | |
|     normal | 43.4% |
|     650°C | 13.4% |

[a] average of three samples
[b] average of two samples

TABLE 2

| Formulation (wt. %) | Samples | | | | Average |
|---|---|---|---|---|---|
| | 1A | 1B | 2A | 2B | |
| Chrysotile fiber[a] | 25 | 25 | 35 | 35 | — |
| Talc | 60 | 60 | 50 | 50 | — |
| Portland Cement | 10 | 10 | 10 | 10 | — |
| Bentonite Clay | 5 | 5 | 5 | 5 | — |
| Properties | | | | | |
| Density, gm/cm³ | 1.06 | 1.06 | 0.99 | 0.99 | |
| Ignition loss, % | 5.8 | 5.9 | 6.0 | 6.1 | 5.9 |
| Compression, % | | | | | |
|   normal | 21.4 | 21.8 | 22.5 | 21.1 | 21.7 |
|   650°C | 26.5 | 26.1 | 25.9 | 26.6 | 26.3 |
| Recovery, % | | | | | |
|   normal | 54.4 | 55.8 | 55.5 | 50.0 | 53.9 |
|   650°C | 25.7 | 25.6 | 22.8 | 22.8 | 24.2 |

[a] 1:1 mixture of 5K and 6D fibers

TABLE 3

| Formulation, wt. % | Samples | | | |
|---|---|---|---|---|
| | 1C | 2C | 3 | 4 |
| Chrysotile fiber | 25[a] | 35[a] | 25[b] | 35[b] |
| Talc | 60 | 50 | 60 | 50 |
| Portland Cement | 10 | 10 | 10 | 10 |
| Bentonite Clay | 5 | 5 | 5 | 5 |
| Properties | | | | |
| Density, gm/cm³ | 1.10 | 1.04 | 1.14 | 1.15 |
| Ignition loss, % | 6.2 | 7.6 | 6.2 | 7.1 |

[a] 1:1 mixture of 5K and 6D fiber
[b] 6D fiber

It will immediately be apparent from the above data that the compositions of this invention produce a product which has a density and ignition loss comparable to that of the prior art materials, despite the fact that the amphibole asbestos component previously believed to be critical is entirely absent from the present composition. Further, and also contrary to the teachings of the prior art, it will be noted that the products of this invention provide an unexpected and surprising superiority in compression and recovery, both under normal conditions and after heating at 650°C. Since ignition loss, and compression and recovery values comprise extremely important criteria for assessing the quality of Lehr rolls, it will immediately be apparent that the products of this invention can be used as Lehr roll materials quite superior to those materials previously available.

What we claim is:

1. A composition useful at temperatures in excess of 500°C which consists essentially of, in percentage by weight of the composition: 15–45% chrysotile asbestos fiber, 40–75% talc component, and 2–35% inorganic binder.

2. The composition of claim 1 wherein said talc component comprises finely divided particles of —400 mesh in size.

3. The composition of claim 2 wherein essentially all of said particles are of a size less than 30 microns.

4. The composition of claim 3 wherein the average particle size is in the range of 2–10 microns and the maximum particle size is approximately 20 microns.

5. The composition of claim 1 wherein said talc component comprises a major portion by weight of platey talc and a minor portion by weight of associated minerals.

6. The composition of claim 5 wherein said talc component comprises 60–100% by weight of platey talc and 0–40% by weight of associated minerals.

7. The composition of claim 6 wherein said talc component comprises 70–100% by weight of platey talc and 0–30% by weight of associated minerals.

8. The composition of claim 1 wherein said inorganic binder comprises hydraulic cement and montmorillonite clay.

9. The composition of claim 8 wherein said cement and clay are present in a weight ratio of approximately 2:1 respectively.

10. The composition of claim 8 wherein said cement is present as 1–20% by weight of the composition and said clay is present as 1–15% by weight of the composition.

11. The composition of claim 1 wherein said chrysotile asbestos comprises a mixture of approximately equal weights of grade 5 and grade 6 fibers.

12. The composition of claim 1 consisting essentially of, in percentage by weight of the composition: 20–40% chrysotile asbestos fiber, 45–65% talc component, and 8–27% inorganic binder.

13. The composition of claim 12 wherein said talc component comprises finely divided particles of —400 mesh in size.

14. The composition of claim 13 wherein essentially all of said particles are of a size less than 30 microns.

15. The composition of claim 14 wherein the average particle size is in the range of 2–10 microns and the maximum particle size is approximately 20 microns.

16. The composition of claim 12 wherein said talc component comprises a major portion by weight of platey talc and a minor portion by weight of associated minerals.

17. The composition of claim 16 wherein said talc component comprises 60–100% by weight of platey talc and 0–40% by weight of associated minerals.

18. The composition of claim 17 wherein said talc component comprises 70–100% by weight of platey talc and 0–30% by weight of associated minerals.

19. The composition of claim 12 wherein said inorganic binder comprises hydraulic cement and montmorillonite clay.

20. The composition of claim 19 wherein said cement and clay are present in a weight ratio of approximately 2:1 respectively.

21. The composition of claim 19 wherein said cement is present as 5–15% by weight of the composition and said clay is present as 3–12% by weight of the composition.

22. The composition of claim 12 wherein said chrysotile asbestos comprises a mixture of approximately equal weights of grade 5 and grade 6 fibers.

23. A method of manufacture of a millboard comprising the composition of claim 1, which method comprises forming a water slurry of chrysotile asbestos fibers, talc component and inorganic binder, transferring said slurry to a rotating screen cylinder, transferring material from said cylinder to a moving belt, and thereafter to a rotating drum whereupon a thickness is accumulated by building up layer upon layer, thereafter slitting said accumulated layers longitudinally of the drum, forming the slit layers into flat sheet form and drying said layers.

24. The method of claim 23 wherein said water slurry also comprises a wetting agent in an amount equal to about 0.01 to 1.0 weight % of the solids content of the composition.

25. A Lehr roll disc comprising the composition of claim 1.

26. A Lehr roll disc comprising the composition of claim 12.

* * * * *